United States Patent
Tsuchiya

(10) Patent No.: US 12,008,275 B2
(45) Date of Patent: *Jun. 11, 2024

(54) IMAGE FORMING APPARATUS ENABLES FIRST WIRELESS COMMUNICATION MODE VIA ACCESS POINT AND SECOND WIRELESS COMMUNICATION MODE NOT VIA ACCESS POINT AND TO FURTHER RECEIVE TRIGGER FRAME VIA THE ACCESS POINT, METHOD, AND NON-TRANSITORY COMPUTER-READABLE STORAGE MEDIUM

(71) Applicant: CANON KABUSHIKI KAISHA, Tokyo (JP)

(72) Inventor: Keigo Tsuchiya, Chiba (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 18/172,683

(22) Filed: Feb. 22, 2023

(65) Prior Publication Data
US 2023/0280953 A1 Sep. 7, 2023

(30) Foreign Application Priority Data
Mar. 1, 2022 (JP) .................. 2022-031121

(51) Int. Cl.
*G06F 3/12* (2006.01)
*H04W 12/73* (2021.01)
(52) U.S. Cl.
CPC .......... *G06F 3/1236* (2013.01); *G06F 3/1203* (2013.01); *G06F 3/1292* (2013.01); *H04W 12/73* (2021.01)

(58) Field of Classification Search
None
See application file for complete search history.

(56) References Cited

U.S. PATENT DOCUMENTS

| 10,645,640 | B2 * | 5/2020 | Suga | H04W 8/005 |
|---|---|---|---|---|
| 2018/0150269 | A1 * | 5/2018 | Yasukawa | G06F 3/1203 |
| 2020/0106920 | A1 * | 4/2020 | Ruan | G06F 3/1236 |
| 2020/0389869 | A1 * | 12/2020 | Patil | H04W 48/16 |
| 2021/0405940 | A1 * | 12/2021 | Tsuchiya | G06F 3/1292 |

FOREIGN PATENT DOCUMENTS

| JP | 2012019487 | A | 1/2012 |
|---|---|---|---|
| JP | 2017539179 | A | 12/2017 |
| JP | 2019193143 | A | 10/2019 |
| JP | 2019527961 | A | 10/2019 |
| JP | 2022011085 | A | 1/2022 |
| WO | 2021002802 | A1 | 1/2021 |
| WO | 2021029555 | A1 | 2/2021 |
| WO | 2023042621 | A1 | 3/2023 |

* cited by examiner

*Primary Examiner* — Haris Sabah
(74) *Attorney, Agent, or Firm* — Canon U.S.A., Inc. IP Division

(57) ABSTRACT

In a case where an image forming apparatus operates as a master station determining a communication channel used in wireless communication, the image forming apparatus transmits a second trigger frame that includes information indicating inexecution of carrier sensing and complies with an Institute of Electrical and Electronics Engineers (IEEE) 802.11 standard, to a slave station apparatus connected to the master station.

10 Claims, 9 Drawing Sheets

FIG.6

| 601 | 602 | 603 | 604 | 605 | 606 | 607 | 608 | 609 |
|---|---|---|---|---|---|---|---|---|
| TRIGGER TYPE | UL LENGTH | CASCADE INDICATION | CS REQUIRED | BW | GI AND LTF TYPE | MU-MIMO LTF MODE | NUMBER OF HE-LTF SYMBOLS | STBC |

FIG.7

| 701 | 702 | 703 | 704 | 705 | 706 | 707 | 708 | 709 |
|---|---|---|---|---|---|---|---|---|
| AID | RU ALLOCATION | FEC CODING TYPE | UL HE-MCS | UL DCM | SS ALLOCATION /RA-RU INFORMATION | TARGET RSSI | RESERVED | TRIGGER DEPENDENT USER INFO |

IMAGE FORMING APPARATUS ENABLES FIRST WIRELESS COMMUNICATION MODE VIA ACCESS POINT AND SECOND WIRELESS COMMUNICATION MODE NOT VIA ACCESS POINT AND TO FURTHER RECEIVE TRIGGER FRAME VIA THE ACCESS POINT, METHOD, AND NON-TRANSITORY COMPUTER-READABLE STORAGE MEDIUM

BACKGROUND OF THE INVENTION

Field of the Invention

The present invention relates to an image forming apparatus, a method, and a medium.

Description of the Related Art

Japanese Patent Application Laid-Open No. 2012-19487 discusses a technique that enables an image forming apparatus to concurrently perform wireless communication in an infrastructure mode through an access point and wireless communication in an ad hoc mode.

In recent years, wireless communication has been used in various cases, and it is desirable to provide wireless communication with high convenience.

SUMMARY OF THE INVENTION

According to an aspect of the present invention, an image forming apparatus includes a communication control unit configured to enable both a first mode in which wireless communication is performed via an external access point outside the image forming apparatus and a second mode in which wireless communication is performed not via the external access point outside the image forming apparatus, a reception unit configured to receive a first trigger frame including information about execution of carrier sensing, from the external access point outside the image forming apparatus while the first and second modes are enabled, the first trigger frame complying with an Institute of Electrical and Electronics Engineers (IEEE) 802.11 standard, a first transmission unit configured to transmit, in a case where the first trigger frame includes information indicating execution of carrier sensing, data after executing carrier sensing, a second transmission unit configured to transmit, in a case where the image forming apparatus operates as a master station determining a communication channel used in wireless communication of the second mode while the first mode and the second mode are enabled, a second trigger frame including information indicating inexecution of carrier sensing, to a slave station apparatus connected to the master station, the second trigger frame complying with the IEEE802.11 standard, and a print processing unit configured to perform print processing on a sheet based on print data received from the slave station apparatus.

Further features of the present invention will become apparent from the following description of embodiments with reference to the attached drawings.

BRIEF DESCRIPTION OF THE DRAWINGS

FIG. 6 is a diagram illustrating an example of a frame configuration.

FIG. 7 is a diagram illustrating an example of a frame configuration.

DESCRIPTION OF THE EMBODIMENTS

An embodiment of the present invention is described in detail below with reference to drawings. It should be noted that the embodiment is merely illustrative, and specific examples of components, processing steps, display screens, and the like are not intended to limit the scope of the present invention unless otherwise noted.

(System Configuration)

Figure 1:
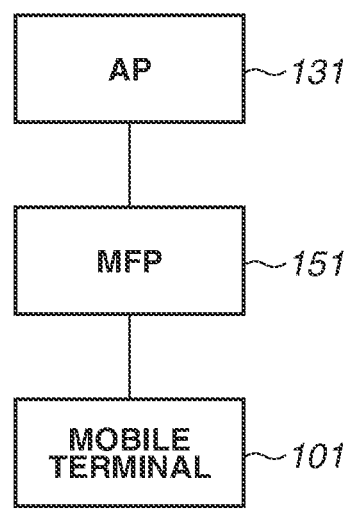
FIG. 1 is a block diagram illustrating an example of a system configuration according to an embodiment.

FIG. 1 illustrates a configuration example of a system according to the present embodiment. As an example, the system is a wireless communication system in which a plurality of communication apparatuses can wirelessly communicate with one another. In the example of FIG. 1, the system includes an access point 131, a multifunctional peripheral (MFP) 151, and a mobile terminal 101. The mobile terminal 101 is illustrative, and can be a laptop computer or a smartphone.

The MFP 151 includes a printing function, a reading function (scanner), and a facsimile (FAX) function. The MFP 151 according to the present embodiment further includes a communication function that can perform wireless communication with the mobile terminal 101. In the present embodiment, a case where the MFP 151 is used is described as an example; however, an apparatus is not limited thereto. For example, in place of the MFP 151, a facsimile apparatus, a scanner apparatus, a projector, or a printing apparatus having a single function can be used. In the present embodiment, an apparatus including a printing function is also referred to as an image forming apparatus in some cases.

The access point 131 is provided separately from (outside) the mobile terminal 101 and the MFP 151, and operates as a base station apparatus for wireless local area network (WLAN). The access point 131 is also referred to as an external access point 131 or an external wireless base station (or external master station) in some cases. The MFP 151 having a WLAN communication function can perform communication in an infrastructure mode of the WLAN through the access point 131. In the following, the access point is also referred to as an "AP" in some cases. Further, the infrastructure mode is also referred to as a "wireless infrastructure mode" in some cases.

The infrastructure mode is a mode in which the MFP 151 communicates with another apparatus through an external apparatus (e.g., access point 131) forming a network. Connection with the external access point established by the MFP 151 operating in the infrastructure mode is referred to as infrastructure connection. In the present embodiment, the MFP 151 operates as a slave station and the external access point operates as a master station in the infrastructure connection. In the present embodiment, a master station is an apparatus determining a communication channel used in a network to which the master station belongs, and a slave station is an apparatus that does not determine a communication channel used in the network to which the slave station belongs, and the slave station uses the communication channel determined by the master station.

The access point 131 performs wireless communication with a (authenticated) communication apparatus having permission of connection to the access point 131, and relays wireless communication between the communication apparatus and another communication apparatus. Further, the access point 131 can be connected to, for example, a wired communication network, and relay communication between a communication apparatus connected to the wired communication network and another communication apparatus wirelessly connected to the access point 131.

Each of the mobile terminal 101 and the MFP 151 can use their own WLAN communication function to perform wireless communication in a wireless infrastructure mode via the external access point 131 or in a peer-to-peer mode not via the external access point 131. In the following, the peer-to-peer mode is referred to as a "P2P mode". The communication not performed via the external access point 131 is referred to as direct wireless communication in some cases. The P2P mode includes a Wi-Fi Direct® mode and a software AP mode. In the following, Wi-Fi Direct® is referred to as WFD in some cases. The P2P mode is compliant with the Institute of Electrical and Electronics Engineers (IEEE) 802.11 series.

The P2P mode is a mode in which the MFP 151 directly communicates with another apparatus, such as the mobile terminal 101. That is, the communication is not performed via an external apparatus that forms a network. In the present embodiment, the P2P mode includes an AP mode in which the MFP 151 operates as an access point. Connection information (SSID and password) relating to the access point enabled in the MFP 151 in the AP mode is optionally set by a user. The P2P mode can include, for example, the WFD mode for the MFP 151 to perform communication through WFD. Which of a plurality of WFD-adaptive apparatuses operates as a master station is determined based on, for example, a sequence called Group Owner Negotiation. Note that the master station can be determined without execution of Group Owner Negotiation. In particular, a WFD-adaptive apparatus functioning as the master station is referred to as a group owner. The connection with another apparatus established by the MFP 151 operating in the P2P mode is referred to as direct connection. In the present embodiment, in the direct connection, the MFP 151 operates as the master station, and the other apparatus (e.g., mobile terminal 101) operates as the slave station.

Figure 2A:
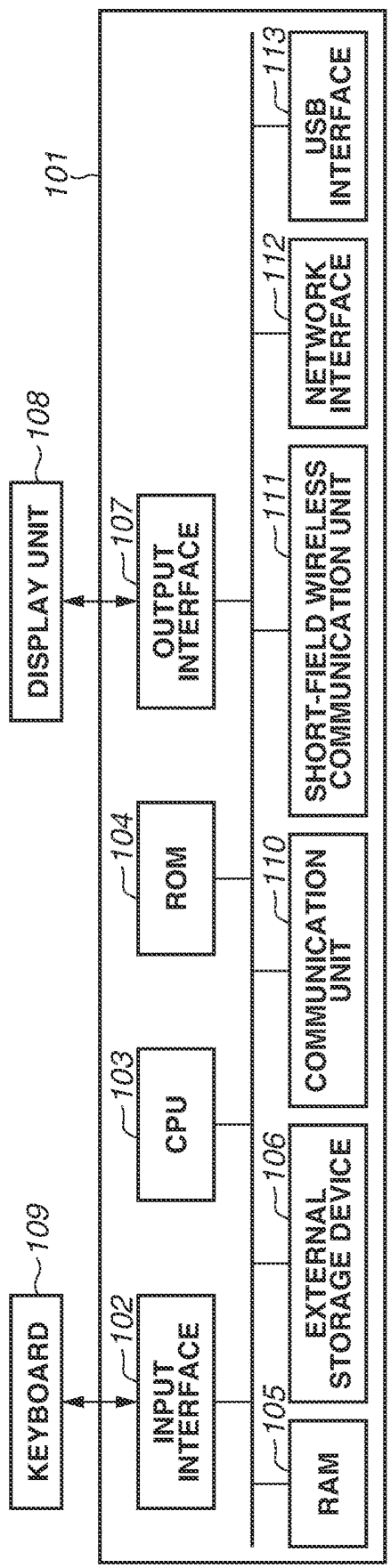
FIG. 2A is a block diagram illustrating an example of a hardware configuration of a mobile terminal.
Figure 2B:
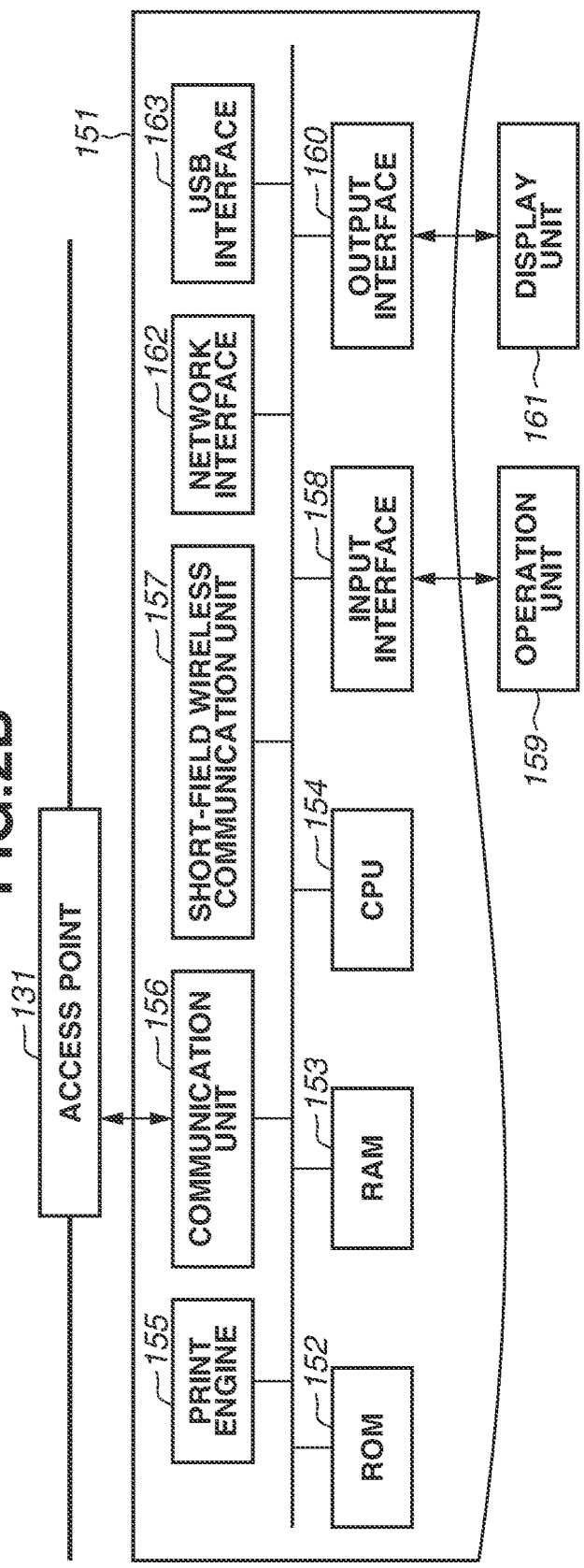
FIG. 2B is a block diagram illustrating an example of a hardware configuration of an image forming apparatus.

A configuration of the mobile terminal according to the present embodiment, and a configuration of a communication apparatus that can communicate with the mobile terminal according to the present embodiment will now be described with reference to FIGS. 2A and 2B. In the present embodiment, the following configurations are described as an example; however, the present embodiment is applicable to an apparatus that can communicate with the communication apparatus, and functions are not particularly limited to the functions illustrated in the figures.

The mobile terminal 101 includes an input interface 102, a central processing unit (CPU) 103, a read only memory (ROM) 104, a random access memory (RAM) 105, an external storage device 106, an output interface 107, a display unit 108, a keyboard 109, a communication unit 110, a short-range wireless communication unit 111, a network interface 112, and a universal serial bus (USB) interface 113. The CPU 103, the ROM 104, the RAM 105, and the like form a computer of the mobile terminal 101. The input interface 102 is an interface for receiving data input or an operation instruction from the user when an operation unit such as the keyboard 109 is operated. The operation unit can be a physical keyboard, physical buttons and the like, or a software keyboard, software buttons, and the like displayed on the display unit 108. In other words, the input interface 102 can receive input (operation) from the user via the display unit 108.

The CPU 103 is a system control unit and controls the whole of the mobile terminal 101. The ROM 104 stores fixed data, such as control programs to be executed by the CPU 103, a data table, and a built-in operating system (OS) program. In the present embodiment, the control programs stored in the ROM 104 perform software execution control, such as scheduling, task switching, and interruption processing, under management of the built-in OS stored in the ROM 104.

The RAM 105 includes a static random access memory (SRAM) needing a backup power supply. The RAM 105 holds data by using a primary battery (not illustrated) for data backup. Therefore, the RAM 105 can store important data, such as program control variables, without volatilization. Further, the RAM 105 includes a memory area where setting information on the mobile terminal 101, management data on the mobile terminal 101, and the like are stored. The RAM 105 is also used as a main memory and a work memory for the CPU 103.

The external storage device 106 stores, for example, a print information generation program generating print information interpretable by the MFP 151. The output interface 107 is an interface controlling the display unit 108 to display data or to notify a state of the mobile terminal 101.

The display unit 108 includes a light-emitting diode (LED) and a liquid crystal display (LCD) to display data and notify the state of the mobile terminal 101. The communication unit 110 is connected to an apparatus, such as the MFP 151 and the access point (AP) 131, to perform data communication. For example, the communication unit 110 can be connected to an access point (not illustrated) in the MFP 151. When the communication unit 110 and the access point in the MFP 151 are connected, the mobile terminal 101 and the MFP 151 can perform P2P communication. The communication unit 110 can directly communicate with the MFP 151 through wireless communication, or can communicate with the MFP 151 through the external apparatus, such as the AP 131 present outside the mobile terminal 101 or the MFP 151. The external apparatus includes an external access point (e.g., AP 131) present outside the mobile terminal 101 and the MFP 151, and an apparatus that can relay communication via other than the access point. In the present embodiment, a wireless communication scheme used by the communication unit 110 is Wireless Fidelity® (Wi-Fi) that is a communication standard complying with the IEEE802.11 series. Examples of the access point 131 include a wireless LAN router.

The short-range wireless communication unit 111 is wirelessly connected to an apparatus, such as the MFP 151, in a short-range, to perform data communication, and performs communication by a communication scheme different from the communication scheme of the communication unit 110.

The short-range wireless communication unit 111 can be connected to, for example, a short-range wireless communication unit 157 in the MFP 151. Examples of the communication scheme include Near Field Communication (NFC), Bluetooth® Classic, Bluetooth® Low Energy (BLE), and Wi-Fi Aware.

The network interface 112 is a connection I/F controlling wireless communication processing and communication processing via a wired LAN cable.

The USB interface 113 is a connection I/F controlling USB connection through a USB cable. More specifically, the USB interface 113 is an interface that is connected to an apparatus, such as the MFP 151 and the external access point 131, via the USB to perform data communication.

The MFP 151 will now be described in relation to FIG. 2B. The MFP 151 includes a ROM 152, a RAM 153, a CPU 154, a print engine 155, a communication unit 156, the short-range wireless communication unit 157, an input interface 158, an operation unit 159, an output interface 160, a display unit 161, a network interface 162, and a USB interface 163. The ROM 152, the RAM 153, the CPU 154, and the like for a computer of the MFP 151.

The communication unit 156 controls communication processing using each interface. As a mode for communication using the communication unit 156, the MFP 151 can operate in, for example, the infrastructure mode and the P2P mode.

More specifically, the communication unit 156 can operate as the access point in the MFP 151. For example, when the user instructs to enable the access point in the MFP 151, the MFP 151 operates as the access point. In the present embodiment, a wireless communication scheme used by the communication unit 156 is a communication standard complying with the IEEE802.11 series. In the following description, Wi-Fi® (Wi-Fi communication) is a communication standard complying with the IEEE802.11 series. The communication unit 156 can include hardware functioning as the access point, or can operate as the access point by software causing the communication unit 156 to function as the access point. In a case of operating as the master station, the communication unit 156 can maintain P2P wireless connection with a predetermined number or less than the predetermined number of (e.g., three or less) slave stations in parallel. For example, the P2P wireless connection may be maintained with three slave stations in parallel or it may be maintained with less than three slave stations in parallel. The communication unit 156 can perform wireless communication using a frequency band selected from 2.4 GHz, 5 GHz, and 6 GHz.

The short-range wireless communication unit 157 is wirelessly connected to an apparatus, such as the mobile terminal 101, in a near field, and can be connected to, for example, the short-range wireless communication unit 111 in the mobile terminal 101. Examples of the communication scheme include NFC, Bluetooth® Classic, BLE, and Wi-Fi Aware.

The RAM 153 includes an SRAM needing a backup power supply. The RAM 153 holds data by using a primary battery (not illustrated) for data backup. The RAM 153 can thereby store important data, such as program control variables, without volatilization. The RAM 153 also includes a memory area storing setting information on the MFP 151 and management data for the MFP 151. The RAM 153 is also used as a main memory or a work memory for the CPU 154. The RAM 153 stores a reception buffer for temporarily storing the print information received from the mobile terminal 101 and various kinds of information.

The ROM 152 stores fixed data, such as control programs to be executed by the CPU 154, a data table, and an OS program. In the present embodiment, the control programs stored in the ROM 152 perform software execution control, such as scheduling, task switching, and interruption processing, under management of the built-in OS stored in the ROM 152.

The CPU 154 is a system control unit and controls the whole of the MFP 151.

The print engine 155 performs print processing forming an image on a recording medium (e.g., a sheet) by applying a recording agent (e.g., ink) to the recording medium, based on information stored in the RAM 153 and a print job received from the mobile terminal 101 or the like, and outputs a print result. The print job transmitted from the mobile terminal 101 or the like typically has a large data amount, and thus the print job is desirably communicated using a communication scheme that can perform high-speed communication. The MFP 151 therefore receives the print job through the communication unit 156 that can perform high-speed communication compared with the short-range wireless communication unit 157. The printing using the ink is illustrative, and the printing can be performed by an electrophotographic method using toner. Further, the MFP can be of a cartridge type in which an ink cartridge is mounted, or of a type in which the ink is replenished to an ink tank of the MFP from an ink bottle.

A memory, such as an external hard disk drive (HDD) and a secure digital (SD) card, can be mounted as an optional device on the MFP 151, and information stored in the MFP 151 can be stored in the memory.

The input interface 158 is an interface receiving data input and an operation instruction from the user when the operation unit 159 (e.g., physical buttons) is operated. The operation unit can be a software keyboard, software buttons, or the like displayed on the display unit 161.

In other words, the input interface 158 can receive input from the user through the display unit 161.

The output interface 160 is an interface controlling the display unit 161 to display data or to notify a state of the MFP 151.

The display unit 161 includes an LED or an LCD, and displays data or notifies the state of the MFP 151.

The USB interface 163 is an interface controlling USB connection via a USB cable. More specifically, the USB interface 163 is an interface connected to an apparatus, such as the mobile terminal 101 and the external access point 131, via the USB to perform data communication.

Figure 3:
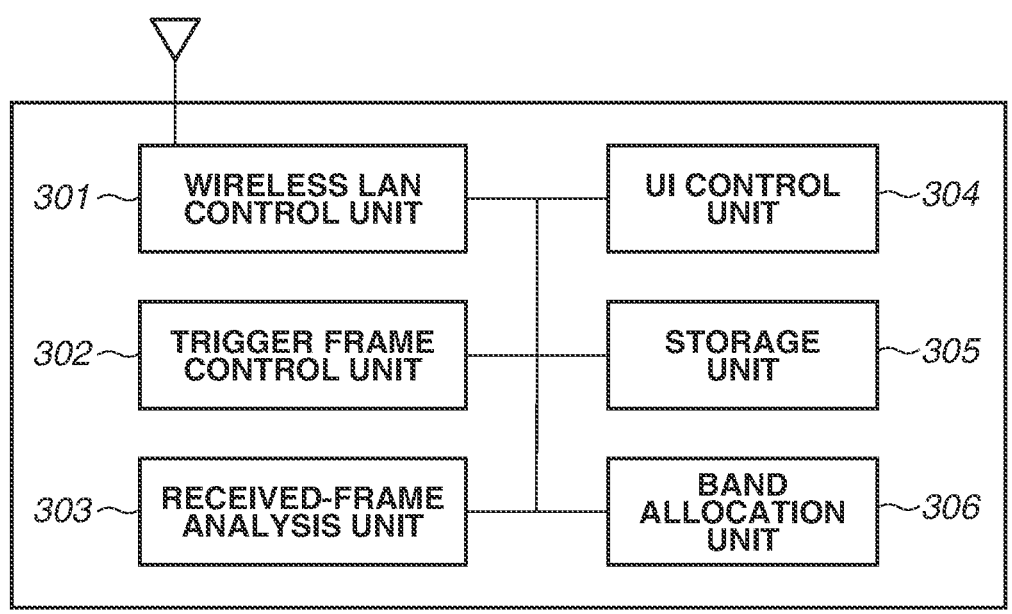
FIG. 3 is a block diagram illustrating an example of a functional configuration of an access point.

FIG. 3 is a block diagram illustrating a functional configuration example of the AP 131. The AP 131 includes, as a functional configuration, a wireless LAN control unit 301, a trigger frame control unit 302, a received-frame analysis unit 303, a UI control unit 304, a storage unit 305, and a band allocation unit 306.

The wireless LAN control unit 301 performs control to transmit/receive a wireless signal to/from another wireless LAN communication apparatus. The wireless LAN control unit 301 is realized by, for example, programs controlling a baseband circuit, a radio frequency (RF) circuit, and an antenna for wireless LAN. The wireless LAN control unit 301 performs wireless LAN communication control according to the IEEE802.11 standard series, and performs wireless communication with a station (STA) complying with the IEEE802.11 standard series.

The trigger frame control unit 302 performs control to transmit Trigger Frame to a STA that has been successfully authenticated, through the wireless LAN control unit 301. When receiving Trigger Frame, the STA transmits an uplink (UL) frame to respond to the frame. When receiving the UL frame through the wireless LAN communication unit 301, the AP 131 interprets contents of the received UL frame using the received-frame analysis unit 303. For example, in a case where the received UL frame includes information on an access category (AC), the received-frame analysis unit 303 analyzes and acquires information on the AC, and grasps that the STA as a transmission source of the UL frame includes transmission object data on which AC.

The band allocation unit 306 determines a width and a center frequency of a frequency band to be allocated for data transmission of each STA, and a time period to which the frequency band is allocated, based on the information acquired by the received-frame analysis unit 303. In other words, the band allocation unit 306 determines a timing and a frequency range of wireless resources to be allocated to each STA. The trigger frame control unit 302 notifies each STA of information on the allocation determined by the band allocation unit 306 through Trigger Frame, and causes each STA to transmit the UL frame based on the allocation.

The UI control unit 304 is realized by a program or the like controlling hardware relating to a user interface, such as a touch panel and buttons for receiving operation to the AP 131 by the user (not illustrated) of the AP 131. The UI control unit 304 can also include a function of presenting information about an image, sound, or the like to the user. The storage unit 305 has a storage function realized by the ROM, the RAM, and the like storing data and programs performed by the AP 131.

In IEEE802.11ax, the frequency band is allocated with a size smaller than 20 MHz as a conventional size, which enables a large number of terminals to use the wireless resources at the same time. Such allocation of the wireless communication resources is performed using Orthogonal Frequency Division Multiple Access (OFDMA).

In IEEE802.11ax, for example, a bandwidth of 20 MHz is divided into nine blocks each including 26 sub-carriers (tones) not overlapping with one another on the frequency axis, and the wireless resources are allocated to the terminals in units of blocks. The block as an allocation unit is referred to as a resource unit (RU), and a size of the RU is determined corresponding to the number of terminals to which the frequency bandwidth and the wireless resources are allocated. The size of the RU is represented in numbers of tones. Examples of the numbers include 26, 52, 106, 242, 484, 996, and 2×996; however, among the numbers, less than or equal to 242 are usable in the bandwidth of 20 MHz. In a case where the whole bandwidth of 20 MHz is allocated to one terminal, up to 242 tones can be allocated. In contrast, for example, in a case where nine terminals use the bandwidth of 20 MHz at the same time, 26 tones are allocated to each of the terminals. As described above, the frequency band is divided by 26 tones that is a minimum allocation unit, which enables the nine terminals to perform communication at the same time using the bandwidth of 20 MHz. Likewise, in a case where the frequency bandwidths of 40 MHz, 80 MHz, and 160 MHz are used, up to 18, 37, and 74 terminals can perform communication at the same time, respectively.

Figure 4:
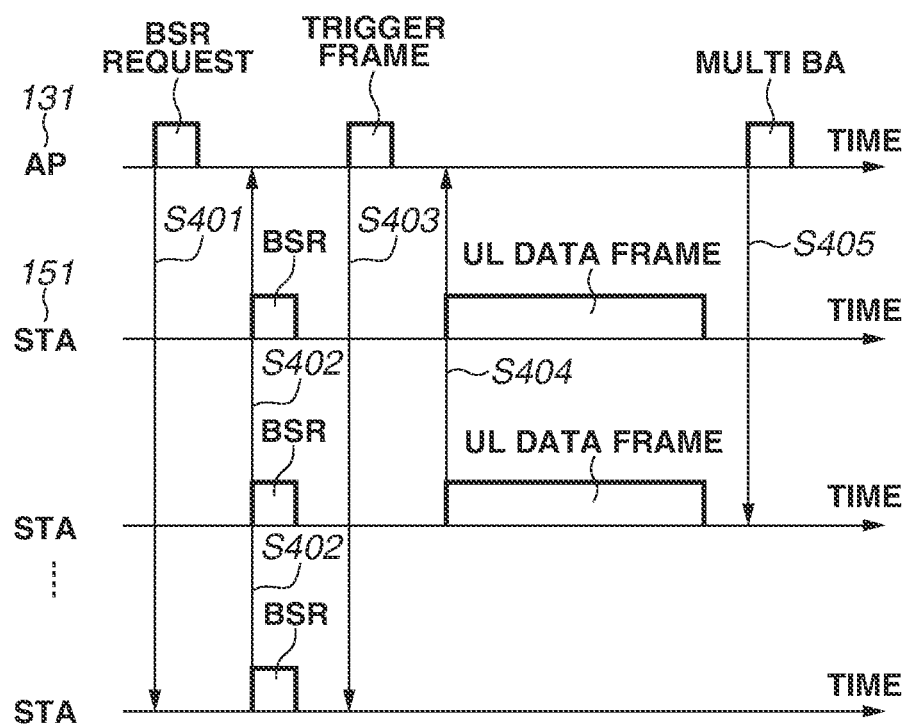
FIG. 4 is a diagram illustrating an example of communication processing according to the present embodiment.
Figure 5:
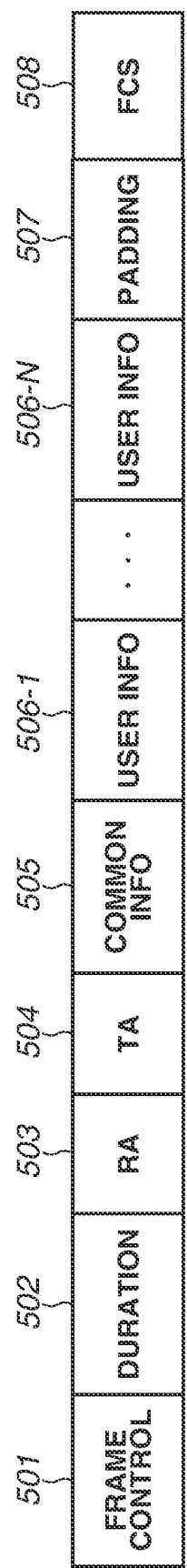
FIG. 5 is a diagram illustrating an example of a frame configuration.

A basic flow of multiuser (MU) UL communication will now be described with reference to FIG. 4. In step S401, the AP 131 causes the trigger frame control unit 302 to transmit Buffer Status Report Request (BSR Request). FIG. 5 illustrates a configuration example of a frame transmitted at this time. In FIG. 5, the frame includes information on fields 501 to 508. In the following, descriptions of fields not relating to descriptions of the present embodiment are omitted. In the present embodiment, the AP 131, the MFP 151, and the mobile terminal 101 can perform communication according to IEEE802.11ax.

Referring back to FIG. 4, in step S402, each STA transmits Buffer Status Report (BSR). In step S402, each STA notifies the AP 131 of presence/absence of data to be transmitted.

Upon receiving the BSR from each STA, in step S403, the AP 131 transmits Trigger Frame prompting transmission of UL data based on the information in the BSR. The frame transmitted at this time also includes, for example, the format illustrated in FIG. 5. In FIG. 5, a Frame Control field 501 is a field that holds a value indicating, for example, Trigger Frame of IEEE802.11ax. FIG. 6 illustrates a data configuration example of a Common Info field 505 illustrated in FIG. 5. The Common Info field 505 includes information on sub-fields 601 to 609 as illustrated in FIG. 6. A value "0" is stored in a Trigger Type sub-field 601. A value corresponding to a communication period common to all STA is stored in an UL Length sub-field 602, and data amount transmittable by each STA is represented by the value. In a case where the value of the Trigger Type sub-field 601 is "0", User Info fields 506-1 to 506-N are added to the frame in FIG. 5. Details of the User Info fields 506-1 to 506-N are described with reference to FIG. 7. In FIG. 7, each of the User Info fields includes information on sub-fields 701 to 709. Each STA is specified by an AID sub-field 701, and an RU and a tone size allocated to the STA are specified by an index value in an RU Allocation sub-field 702. The tone size is a value indicating a width of the frequency band that can be allocated to each STA.

The AP 131 reserves a communication channel to transmit Trigger Frame. Further, the AP 131 divides the reserved communication channel to a plurality of resource units in a frequency range, and allocates the resource units to the terminals.

Referring back to FIG. 6, a Carrier Sense (CS) Required sub-field 604 has a length of one bit. Information indicating whether execution of carrier sensing is necessary or not is stored in the CS Required sub-field 604. In a case where information indicating that execution of carrier sensing is necessary is included in the CS Required sub-field 604, the communication apparatus having received Trigger Frame therefore executes carrier sensing. In contrast, in a case where information indicating that execution of carrier sensing is unnecessary is included in the CS Required sub-field 604, the communication apparatus having received Trigger Frame does not execute carrier sensing.

Upon receiving Trigger Frame, in step S404, each STA transmits a UL Data frame within a range of the data amount determined by the UL Length sub-field 602 of Trigger Frame. At this time, in the case where the information indicating that execution of carrier sensing is necessary is included in the CS Required sub-field 604, the STA executes carrier sensing and then performs the transmission in step S404. When receiving physical layer protocol data unit (PPDU) from each STA, the AP 131 transmits Multi Block Ack (Multi BA) as reception acknowledgement in step S405.

Figure 8:
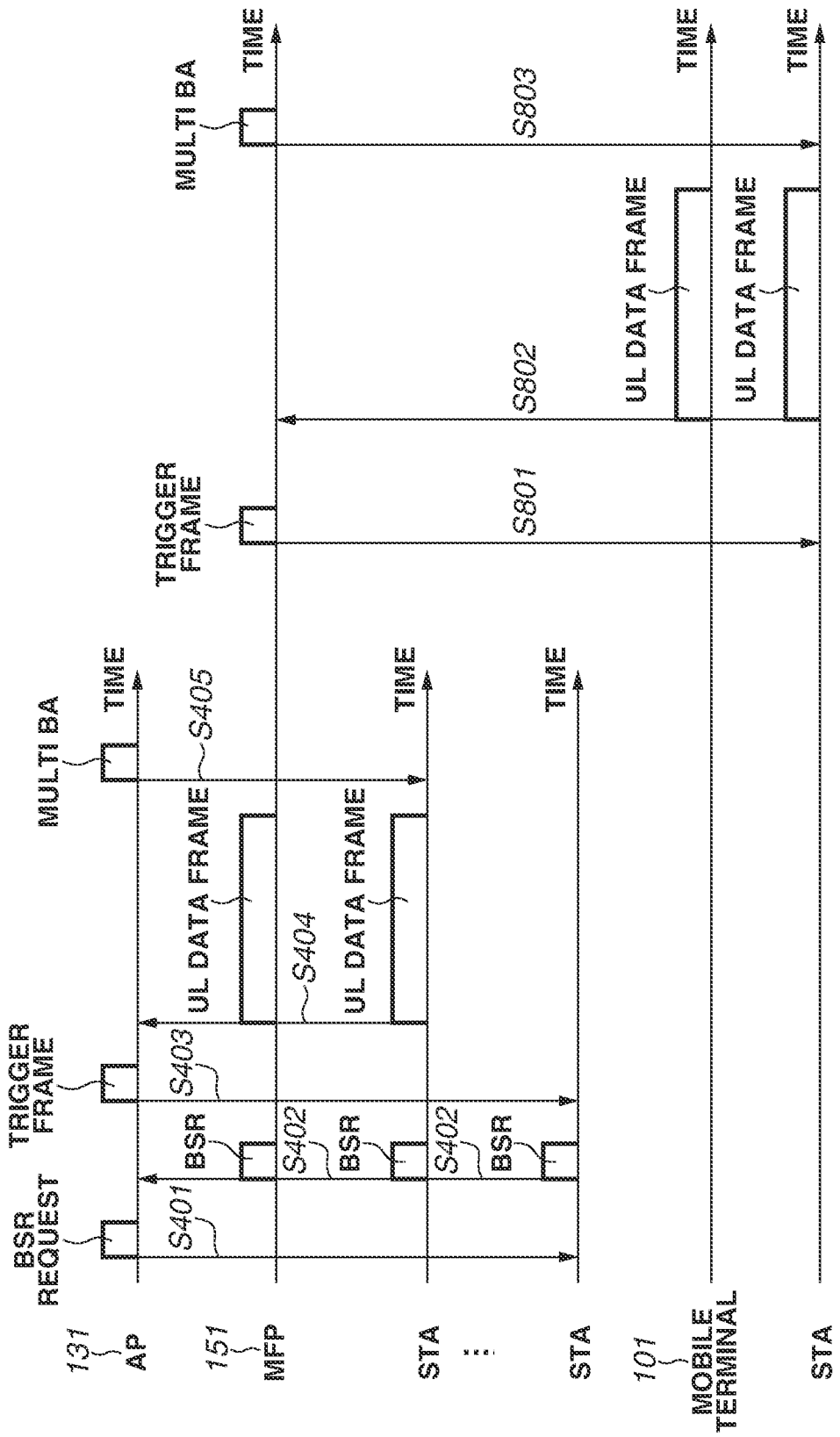
FIG. 8 is a diagram illustrating an example of communication processing according to the present embodiment.

Operation of the MFP 151 will now be described with reference to FIG. 8. It is assumed that, in the MFP 151, both the infrastructure mode and the P2P mode are enabled/set by an instruction from the user.

For example, when the user enables the infrastructure mode of the MFP 151 and enables the WFD mode, both the infrastructure mode and the P2P mode are enabled. The MFP 151 also operates as a master station (e.g., group owner of WFD) in the P2P communication. It is assumed that the MFP 151 has received Trigger Frame from the AP 131 in step S403. In the case where both the infrastructure mode and the P2P mode are enabled, the MFP 151 can refer to a communication channel used for infrastructure communication, and construct a network as the master station to perform P2P communication using the same communication channel. In the case where both the infrastructure mode and the P2P mode are enabled, the MFP 151 can refer to a communication channel used for infrastructure communication, and construct a network as the master station to perform P2P communication using a channel different from the communication channel used for the infrastructure communication. In other words, in FIG. 8, in step S403, the MFP 151 receives Trigger Frame complying with the IEEE802.11 standard, including information about execution of carrier sensing, from the external access point while both the infrastructure mode and the P2P mode are enabled.

In step S801, the MFP 151 transmits Trigger Frame because the MFP 151 operates as the master station. At this time, the MFP 151 divides one communication channel (e.g., 20 MHz) into a plurality of resource units by using Trigger Frame as described above in FIG. 5, and allocates the resource units to the STAs including the mobile terminal 101. In other words, the RU Allocation sub-field 702 of Trigger Frame transmitted from the MFP 151 includes information about the allocation of the resource unit. Further, the CS Required sub-field 604 of Trigger Frame transmitted from the MFP 151 includes the information indicating that carrier sensing is unnecessary. The number of slave station apparatuses to which the resource units are allocated by the MFP 151 is the maximum number of slave station apparatuses that can maintain the direct connection in parallel. For example, in a case where the communication unit 156 can maintain the P2P wireless connection with up to three slave station apparatuses in parallel, the maximum number of slave station apparatuses to which the resource units are allocated is three. In step S802, the mobile terminal 101 transmits data to the MFP 151. At this time, the mobile terminal 101 transmits the data by using the resource unit allocated by Trigger Frame. In the present embodiment, since the information indicating that carrier sensing is unnecessary is set, the mobile terminal 101 transmits the data to the MFP 151 without executing carrier sensing. The MFP 151 can notify the mobile terminal 101 of remaining amounts of consumables (ink or toner) through the direct connection. As a result, an application operating in the mobile terminal 101 can display the remaining amounts of the consumables. Other states of the MFP 151 can also be communicated through the direct connection. Examples of the other states include a state of no paper in the MFP 151, a state where a cover of the MFP 151 is opened, and an error state (e.g., paper jam) in the MFP 151.

Figure 9:
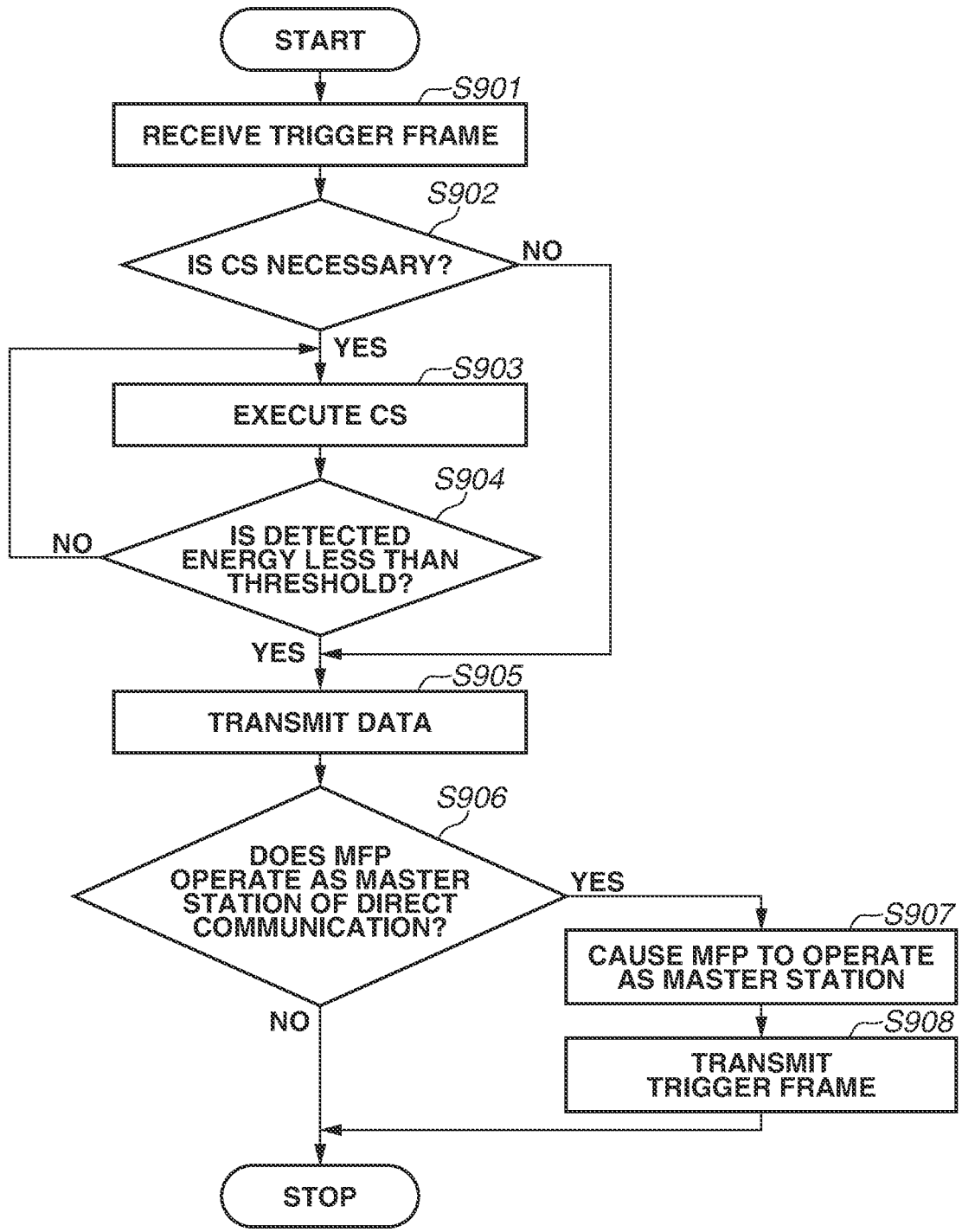
FIG. 9 is a flowchart performed in the image forming apparatus.

Processing performed by the MFP 151 will now be described with reference to a flowchart as shown in FIG. 9. The flowchart in the present embodiment is realized when the CPU 154 reads out programs relating to the processing of the flowchart from the ROM 152 and executes the programs. In step S803, MFP 151 transmits Multi Block Ack (Multi BA) as reception acknowledgement.

In step S901, the CPU 154 receives Trigger Frame described above in step S403 of FIG. 4, from the AP 131. In step S902, the CPU 154 checks whether execution of carrier sensing (CS) is necessary. The processing in step S902 is realized with reference to the information on the CS Required sub-field 604 illustrated in FIG. 6. In a case where it is determined in step S902 that carrier sensing is unnecessary (NO in step S902), the processing proceeds to step S905. In step S905, the CPU 154 transmits data to be transmitted to a target apparatus through the AP 131 without executing carrier sensing.

In contrast, in a case where it is determined in step S902 that carrier sensing is necessary (YES in step S902), the processing proceeds to step S903. In step S903, the CPU 154 executes carrier sensing to sense energy (power) of radio waves generated in the communication channel specified by Trigger Frame. In step S904, it is determined whether the sensed energy is greater than or equal to a threshold. In a case where it is determined that the energy of the radio waves generated in the communication channel is greater than or equal to the threshold (NO in step S904), the CPU 154 determines that data cannot be transmitted to the AP 131, and the processing returns to step S903. In the case where the determination result is NO in step S904, processing can proceed to step S906 omitting the processing in step S905.

In contrast, in a case where it is determined that the power generated in the communication channel is less than the threshold (YES in step S904), the CPU 154 determines that data can be transmitted to the AP 131, and the processing proceeds to step S905. In step S905, the CPU 154 transmits data to be transmitted to the target apparatus through the AP 131. For example, scan data obtained when the MFP 151 reads a document, or status information on the MFP 151 is transmitted in step S905. The CPU 154 transmits the data to be transmitted, by using the resource unit allocated to the MFP 151 by the RU Allocation sub-field 702.

In step S906, the CPU 154 determines whether the MFP 151 operates as a master station of the direct communication. For example, in a case where the user instructs to the MFP 151 to enable WFD, and the MFP 151 is determined to operate as a group owner by negotiation processing (comparison of intent value) with a communication partner apparatus of the WFD, the CPU 154 determines as YES in step S906. In a case where the user instructs the MFP 151 to enable the software AP mode, the CPU 154 determines as YES in step S906.

In step S907, the CPU 154 causes the MFP 151 to operate as a master station of the direct communication. In step S908, the CPU 154 transmits Trigger Frame to a slave station (e.g., mobile terminal 101) connected to the MFP 151. At this time, the MFP 151 sets the information indicating that carrier sensing is unnecessary, to the CS Required sub-field 604 illustrated in FIG. 6, and then transmits Trigger Frame illustrated in FIG. 5. The CPU 154 also allocates the resource unit used by the apparatus (e.g., mobile terminal 101) connected to the MFP 151, by the RU Allocation sub-field 702. In this case, the mobile terminal 101 transmits data to the MFP 151 by using the allocated resource unit. For example, the mobile terminal 101 transmits print data to the MFP 151 by using the allocated resource unit.

In FIG. 9, a mode in which steps S906 to S908 are performed after steps S901 to S905 is described; however, the CPU 154 may perform the processing in a reverse order. In other words, after steps S906 to S908 are performed, steps S901 to S905 can be performed. Further, steps S901 to S905 and steps S906 to S908 can also be performed in parallel.

In a case where the infrastructure communication is disabled and the direct communication is enabled, the CPU 154 can perform steps S906 to S908.

According to the present embodiment, even in the case where execution of carrier sensing is instructed from the AP 131, the MFP 151 instructs the slave station connected to the MFP 151 to transmit data without executing carrier sensing.

As a result, the slave stations including the mobile terminal 101 can efficiently transmit print data and the like, and for example, the user can reduce a time after instruction of printing until acquisition of a printed product.

The present invention can be realized by supplying a program realizing one or more functions of the above-described embodiment to a system or an apparatus through a network or a storage medium, and causing one or more processors in a computer of the system or the apparatus to read out and execute the program. Further, the present invention can be realized by a circuit (e.g., application specific integrated circuits (ASIC)) realizing one or more functions.

According to the present embodiment, it is possible to provide a more efficient wireless communication technique.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to embodiments, it is to be understood that the invention is not limited to the disclosed embodiments. The scope of the following claims is to be accorded the broadest interpretation so as to encompass all such modifications and equivalent structures and functions.

This application claims the benefit of Japanese Patent Application No. 2022-031121, filed Mar. 1, 2022, which is hereby incorporated by reference herein in its entirety.

What is claimed is:

1. An image forming apparatus, comprising:
at least one memory and at least one processor and/or at least one circuit, which function as:
a communication control unit configured to enable both a first mode in which wireless communication is performed via an external access point, wherein the external access point is located outside the image forming apparatus and a second mode in which wireless communication is not performed via the external access point;
a reception unit configured to receive a first trigger frame including information about execution of carrier sensing, from the external access point while the first and second modes are enabled, the first trigger frame complying with an Institute of Electrical and Electronics Engineers (IEEE) 802.11 standard;
a first transmission unit configured to transmit, in a case where the first trigger frame includes information indicating execution of carrier sensing, data after executing carrier sensing;
a second transmission unit configured to transmit, in a case where the image forming apparatus operates as a master station configured to determine a communication channel used in wireless communication of the second mode while the first mode and the second mode are enabled and the first trigger frame is received, a second trigger frame including information indicating inexecution of carrier sensing, to a slave station apparatus connected to the master station, the second trigger frame complying with the IEEE802.11 standard; and
a print processing unit configured to perform print processing on a sheet based on print data received from the slave station apparatus.

2. The image forming apparatus according to claim 1, wherein the at least one memory and the at least one processor and/or the at least one circuit further function as a reading unit configured to read a document to acquire scan data,
wherein, in a case where the carrier sensing is executed and it is determined that sensed energy is less than a threshold, the first transmission unit transmits the scan data by using at least one resource unit allocated to the image forming apparatus by the first trigger frame.

3. The image forming apparatus according to claim 1, wherein the second trigger frame includes the information indicating inexecution of the carrier sensing, and information about allocation of at least one resource unit.

4. The image forming apparatus according to claim 1, wherein a maximum number of apparatuses to which resource units designated by the second trigger frame are allocated is equal to a maximum number of slave station apparatuses maintainable in the wireless communication of the second mode in parallel.

5. The image forming apparatus according to claim 1, wherein the image forming apparatus operating as the master station maintains wireless connection of the second mode with a predetermined number or less than the predetermined number of slave station apparatuses in parallel.

6. The image forming apparatus according to claim 1, wherein wireless communication of the first mode and wireless communication of the second mode are performed through the same communication channel.

7. The image forming apparatus according to claim 1, wherein wireless communication of the first mode and wireless communication of the second mode are performed through different communication channels.

8. The image forming apparatus according to claim 1, wherein the image forming apparatus performs wireless communication using a frequency band selected from 2.4 GHz, 5 GHz, and 6 GHz.

9. A method for performing a print job by an image forming apparatus (151), the method comprising:
setting a first mode in which wireless communication is performed via an external access point, wherein the external access point is located outside the image forming apparatus and a second mode in which wireless communication is not performed via the external access point;

receiving a first trigger frame including information about execution of carrier sensing, from the external access point while the first and second modes are enabled, the first trigger frame complying with an Institute of Electrical and Electronics Engineers (IEEE) 802.11 standard;

transmitting via a first transmission means, in a case where the first trigger frame includes information indicating execution of carrier sensing, data after executing carrier sensing;

transmitting via a second transmission means, in a case where the image forming apparatus operates as a master station configured to determine a communication channel used in wireless communication of the second mode while the first mode and the second mode are enabled and the first trigger frame is received, a second trigger frame including information indicating inexecution of carrier sensing to a slave station apparatus connected to the master station, the second trigger frame complying with the IEEE802.11 standard; and performing print processing on a sheet based on print data received from the slave station apparatus.

10. A non-transitory computer-readable storage medium having stored thereon a computer program comprising instructions, which when executed by an image forming apparatus causes the image forming apparatus to perform the method of claim 9.

* * * * *